(12) United States Patent
Tang et al.

(10) Patent No.: US 7,847,954 B2
(45) Date of Patent: Dec. 7, 2010

(54) MEASURING THE SHAPE AND THICKNESS VARIATION OF A WAFER WITH HIGH SLOPES

(75) Inventors: Shouhong Tang, Tucson, AZ (US); Romain Sappey, Tucson, AZ (US)

(73) Assignee: KLA-Tencor Corporation, Milpitas, CA (US)

( * ) Notice: Subject to any disclaimer, the term of this patent is extended or adjusted under 35 U.S.C. 154(b) by 286 days.

(21) Appl. No.: 12/121,250

(22) Filed: May 15, 2008

(65) Prior Publication Data

US 2009/0284734 A1 Nov. 19, 2009

(51) Int. Cl.
*G01B 11/02* (2006.01)

(52) U.S. Cl. ........................ 356/512; 356/503

(58) Field of Classification Search .......... 356/485, 356/489, 503–504, 511–514, 516
See application file for complete search history.

(56) References Cited

U.S. PATENT DOCUMENTS

| | | | |
|---|---|---|---|
| 6,480,286 B1 * | 11/2002 | Kubo et al. ............ | 356/503 |
| 6,594,002 B2 * | 7/2003 | Drohan et al. .......... | 356/73 |
| 6,847,458 B2 * | 1/2005 | Freischlad et al. ...... | 356/503 |
| 6,885,459 B2 * | 4/2005 | Muller .................. | 356/503 |
| 6,925,860 B1 * | 8/2005 | Poris et al. ............ | 73/105 |
| 7,057,741 B1 * | 6/2006 | Mueller et al. ......... | 356/512 |
| 2003/0210404 A1 | 11/2003 | Hill | |
| 2005/0151951 A1 | 7/2005 | Hill | |
| 2008/0068614 A1 | 3/2008 | DeGroot | |

* cited by examiner

*Primary Examiner*—Michael A Lyons
(74) *Attorney, Agent, or Firm*—Luedeka, Neely & Graham, P.C.

(57) ABSTRACT

A system with two unequal path interferometers, with a first flat, a second flat, and a cavity between the first and second flats, a holder to receive an object in the cavity such that an optical path remains open between the first and second flats, and a motor coupled to the holder such that the object may be tilted in the cavity to allow for measurements of, and a radiation assembly to direct collimated radiation to the interferometer assembly, a collecting assembly to collect radiation received from the interferometer assembly, and a controller comprising logic to; vary a wavelength of the radiation, record interferograms, extract phases of the interferograms to produce phase maps, determine from each map areas with high slopes, tilt the holder to allow measurement of the high slope areas, and process measurement that covers the entire surface of the object.

24 Claims, 4 Drawing Sheets

MEASURING THE SHAPE AND THICKNESS VARIATION OF A WAFER WITH HIGH SLOPES

BACKGROUND

This application relates to radiation-based inspection techniques and more particularly to interferometric profilometry systems and methods which may be used to measure the shape, and thickness variation of a wafer with high slopes.

BRIEF SUMMARY OF THE INVENTION

In one embodiment, an interferometer system comprises two unequal path interferometers assemble comprising; a first reference flat having a first length L1 in a first dimension, a second reference flat having a second length L2 in the first dimension, a cavity D1 defined by a distance between the first reference flat and the second reference flat, a wafer holder to receive an object in the cavity such that an optical path remains open at an outer annual area between the first reference flat and the second reference flat and at least one wafer holder motor coupled to the wafer holder such that an object may be tilted in the cavity as to allow for measurements of local areas of interest, and a radiation targeting assembly to direct a collimated radiation beam to the interferometer assembly, a radiation collecting assembly to collect radiation received from the interferometer assembly, and a controller comprising logic to; vary a wavelength of the collimated radiation beam, record interferograms formed by a plurality of surfaces, extract phases of each of the interferograms for each of the plurality of surfaces to produce multiple phase maps, determine each map from its corresponding interferogram, determine from each map local areas of interest with high slopes, tilt the wafer holder to allow measurement of the high slope areas of interest, and process measurement that covers the entire surface of an object including high slope areas.

DETAILED DESCRIPTION

Figure 1:
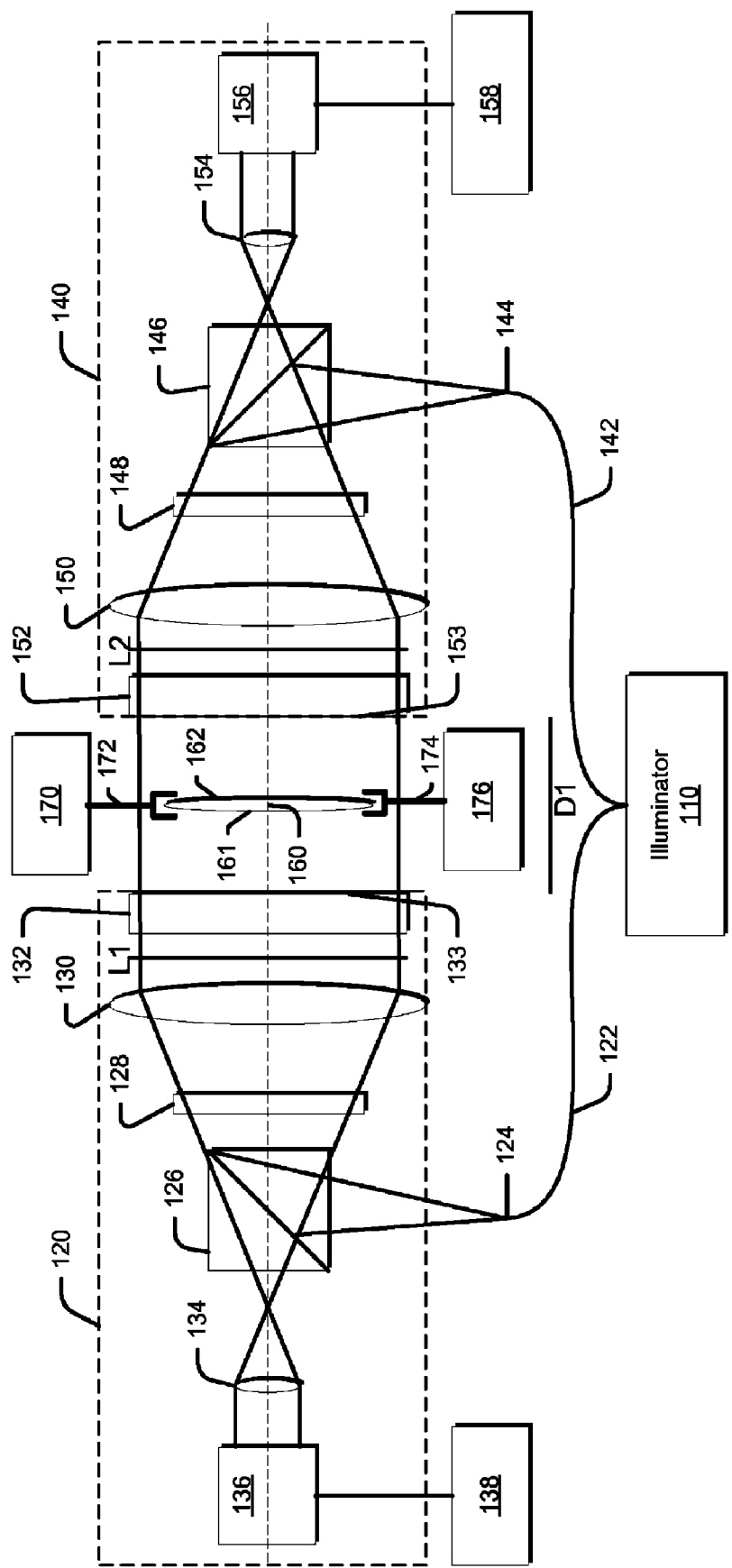
FIG. 1 is a schematic illustration of an interferometer assembly according to embodiments.

Described herein are exemplary systems and methods which may be used to measure the surface height on both sides and the thickness variation of a wafer with high surface slopes. In the following description, numerous specific details are set forth in order to provide a thorough understanding of various embodiments. However, it will be understood by those skilled in the art that the various embodiments may be practiced without the specific details. In other instances, well-known methods, procedures, components, and circuits have not been described in detail so as not to obscure the particular embodiments.

Embodiments described herein may be used in conjunction with two unequal path length interferometers (such as Fizeau interferometers), contemporaneously acquiring two sets of intensity frames that record interferograms generated with wavefronts reflected from both sides of a wafer surfaces and from the reference flats. These intensity frames may be acquired sequentially, by changing the wavelength in a measurement system. The wavelength can be changed mechanically, or, preferably, with a tunable laser light source. As used herein, the phrase contemporaneous events refers to events which happen within a reasonable time period of one another, given the technical circumstances. As used herein, the term "contemporaneous" should not be construed to mean "simultaneous." Embodiments of an interferometer assembly for contemporaneous acquisition of multiple sets of intensity frames are described in U.S. Pat. No. 6,847,459 to Freischlad, et al., entitled METHOD AND APPARATUS FOR MEASURING THE SHAPE AND THICKNESS VARIATION OF POLISHED OPAQUE PLATES, the disclosure of which is incorporated herein by reference in its entirety.

In general, the methods described herein take advantage of the fact that the high spatial slope of the optical path difference (OPD) between a wafer surface and a reference flat can be locally nulled or reduced by changing tilt of the wafer. This implies that the interferogram moves around on the imaging plane or the measuring area of the wafer surface shifts if the tilt of the wafer changes. This is because an interferogram only appears at the area where spatial slope of OPD is small and the measurement is only accomplished at the area where the interferogram is visible. A map of partial wafer surface may be achieved from each measurement at a tilt position of the wafer. Multiple such maps that correspond to different parts of the wafer surface may be required to measure a wafer with high surface slopes.

In general, the system and method of an embodiment of the invention may be able to produce a height map that covers a wafer surface with high slopes by combining multiple maps of partial wafer surface measurements.

In general, the system and method of a preferred embodiment of the invention may be able to construct the surface height maps on a part of or whole wafer on both sides simultaneously and may be able to measure thickness variation of a wafer without errors results from the cavity path difference.

In general, the system and method of an embodiment of the invention employs two reference flats that are larger in size than the measuring wafer. While the center part of reference flats forms the interferograms with the wafer surfaces, their outside annular area generates the interferogram of themselves. In some embodiments, the invention is not only is able to determine the location of a testing wafer very precisely by finding out its shade on the reference flats but also is able to monitor the relative tilt change of reference flats with every measurement. Consequently, it is capable of measuring the wafer edge location without the influence of the surface slopes at the wafer edge thereby significantly increases the measurement repeatability.

FIG. 1 is a schematic illustration of an interferometer assembly according to embodiments. In some embodiments, the unequal path interferometer may be a Fizeau interferometer. In some embodiments, the unequal path interferometer may be a Twyman-Green interferometer. An overview of an embodiment of the invention is shown in FIG. 1. For wafer measurement, a wafer 160 may be placed in a cavity in the center between two improved Fizeau interferometers 120 and 140, such that both wafer sides 161 and 162 are minimally obscured by the holding devices 172, 174. The interferometers 120 and 140 may operate in the following way: light is emitted from an illuminator 110 along fibers 122, 142, reflected at a polarizing beam splitter 126, 146 and passes through a quarter-wave plate 128, 148 aligned at 45 degrees to the polarization direction of the polarizing beam splitter 126, 146. Two multimode optic fibers 142 and 122 collect the light from the illuminator 110 and carry it to the two source locations 144 and 124 of the two interferometer channels 140 and 120. The light is circularly polarized after the quarter-wave plate. This beam then propagates to the lens 130, 150, where it is collimated with a beam diameter larger than the wafer diameter. The collimated beam then falls on the reference flat 132, 152, where part of the light is reflected at the reference surface, and another part is transmitted. The central part of the transmitted beam is reflected at the test surface 161, 162; and the outer part of the transmitted beam travels on to the opposite reference flat 152, 132, where it is reflected at the reference surface 153, 133.

The light reflected at the wafer surface 161, 162 constitutes the wafer test beam. The light reflected at the opposite reference surface 133, 153 constitutes the cavity ring test beam; and the light reflected at the reference surface constitutes the reference beam. All three reflected beams travel back through the reference flat 152, 132 and through the collimator lens 150, 130 to the quarter-wave plate 148, 128. After the quarter-wave plate, the beams are linearly polarized with the plane of polarization of the reflected beams rotated 90 degrees compared to the outgoing beams. When the reflected beams reach the beam splitter 146, 126, they are transmitted and directed to an imaging lens 154, 134, which relays the beams to a detector 156, 136, where the interference patterns between the test beams (reflected from the wafer 160) and the reference beams occur.

The detector 156, 136 may consist of a video camera, the signal of which is digitized and further processed in a computer 158, 138. The computers 158 and 138 of each interferometer channel are connected for data exchange and synchronization. Alternatively, one common computer could be used to receive the camera signals of both channels. Computers 158, 138 are further discussed with reference to FIG. 3.

The data acquisition is now described in more detail for interferometer channel 140. The second interferometer channel 120 behaves in an equivalent way. The two reference surfaces 153, 133 and the wafer 160 are substantially parallel. Thus, the interference pattern appears on detector 156. There is a central area of interference fringes imposed on the wafer surface, generated by interference of the wafer test beam, with the reference beam. In addition, there is an area surrounding the wafer 160 with interference fringes generated by the cavity ring test beam and the reference beam. Depending on the slopes of the wafer surfaces, there may be a zone without any interference fringes. This zone without fringes is caused by the test beam being reflected at such high angles that it does not reach the camera.

In some embodiments, wafer holding devices 172, 174 may be actively tilted by holding device motors 170, 176 in a controlled way between data acquisitions to allow measurements of local areas on the wafer with high slopes. By way of example and not limitation an area may be considered to have a high slope when a surface slopes greater than wavelength divided by twice w, where w is the pixel width. The wafer tilting may be performed to null the local high slopes in a region of interest of the wafer, which corresponds to a certain sensing area of the detectors 156, 136. In such embodiments, predictions may be made as to what tilt may yield a complete dataset covering the full area of the wafer. Therefore, a wafer with high surface slope may be measured by an adequate sequence of tilts of the wafer. In some embodiments, the wafer holding devices 172 and 174 are a right body or can not move relatively. In such embodiments, the wafer holding devices 172 and 174 are always tilted together by either the holding device motors 170 or 176. This allows for the free shape of the wafer to be more accurately measured. In some embodiments, any suitable wafer holding device may be used, with a preferred holder being a vertical wafer pallet minimizing the stress on the wafer to be held. In such embodiments, this may allow for the free shape of the wafer to be more accurately measured. In operation, the wafer holding device may be implemented by using two computer controlled piezo-actuated flexures allowing the angles to be precisely controlled.

In order to obtain height maps from the interference patterns, a phase-shifting data acquisition method is applied to extract the interferometric fringe phase. In some embodiments, extracting phases of each of the interferograms may be effected by a computer. In some embodiments, recording the multiple optical interferograms may be effected by means of a CCD camera.

Figure 2A:
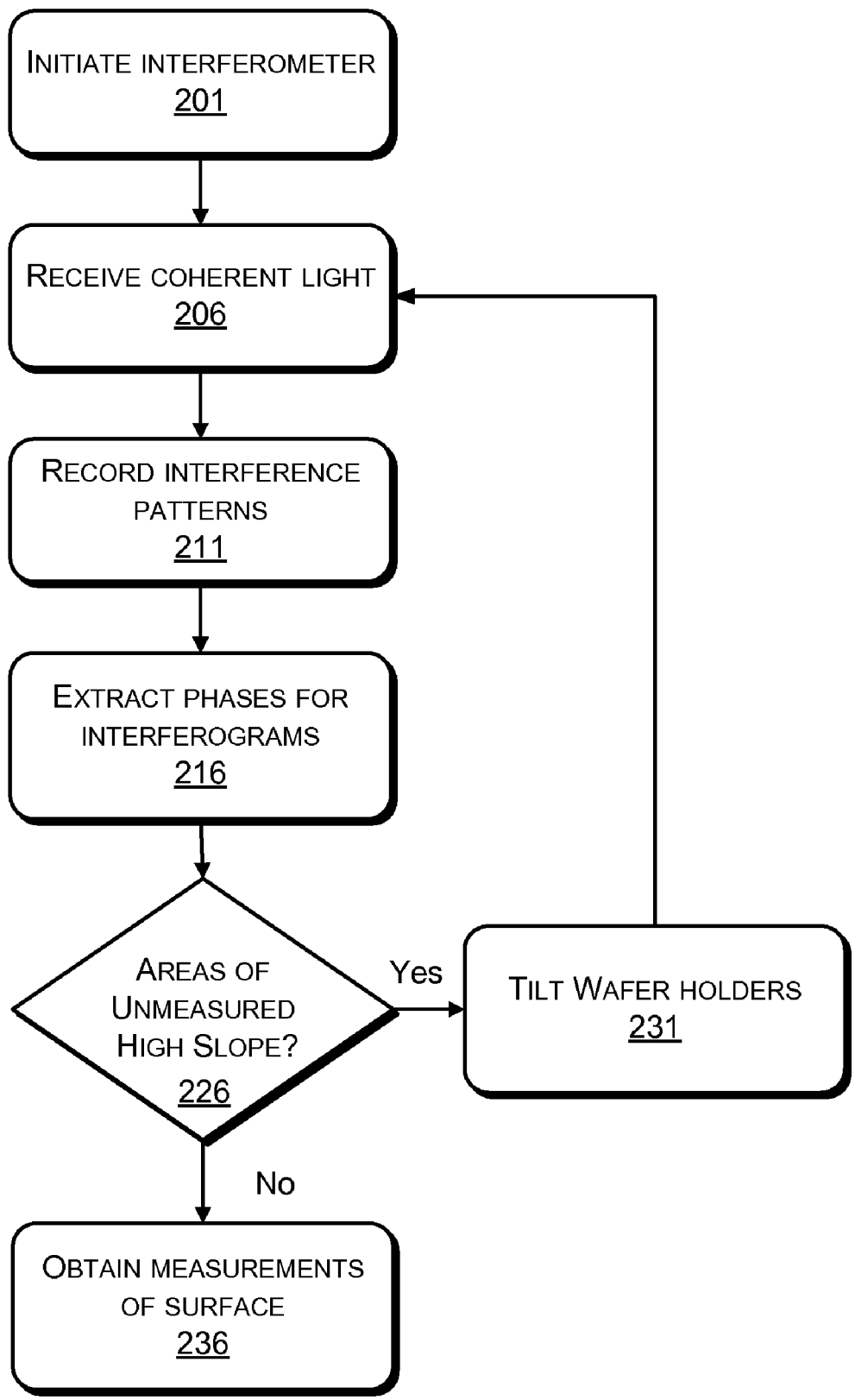
FIG. 2A is a flowchart illustrating operations of a method which may be used to measure the shape and thickness of a wafer with high slopes according to an embodiment.

FIG. 2A is a flowchart illustrating operations of a method which may be used to measure the shape and thickness of a wafer with high slope areas according to an embodiment. At operation 201, an interferometer may be initiated. In some embodiments, a test object such as, but not limited to, a wafer may be placed in the interferometer. By way of example and not limitation, the interferometer may be a Fizeau interferometer, a Twyman-Green interferometer, or the like. At operation 206, coherent light may be supplied to a test object. In some embodiments, the coherent light may be supplied by a tunable laser or the like. At operation 211, an interferometer may record interference patterns. In some embodiments, recording the multiple optical interferograms may be effected by means of a CCD camera. At operation 216, interferograms may be extracted from data recorded by the interferometer. In some embodiments, extracting phases of the interferograms from each channel of the interferometer may be effected by a computer. In some embodiments, the process of extracting phases may be affected by two computers.

In some embodiments, analysis of these interferograms allows for the determination of various information, such as but not limited to, local areas of interest on the surface of the object that have high slopes. These areas of high slope do not produce height or thickness information as the reflected light returns at such an angle as it is not received by the detectors. At operation 226, the object surface is analyzed to determine in there are any areas of high slope which may require further analysis to determine their properties. If at operation 226, there are local areas of interest for additional analysis, then at operation 231 the wafer may be titled by the wafer holding devices. In operation, predictions may be made as to what tilt sequence may yield a complete dataset covering the full area of the wafer.

Once the wafer has been tilted to the determined angle, additional interferograms are produced through repeating operations 206 to 216 until there are no longer unmeasured high slope areas. If at operation 226, there are no areas that may require additional analysis due to high slopes, then at operation 236 complete parameter maps of the object surface may be produced. In some embodiments, a computer may stitch together all partial surfaces that are taken at different tilts and partially overlap each other and thereby produce a measurement that covers the entire object surface.

Additional information relating to the wafer properties may by obtained through analysis of phase maps obtained from the interferograms. By way of example and not limitation, arbitrarily identifying the phase of the interferogram formed by the front reference plate and the front of the wafer surface as A, and the phase of the interferogram formed by the back reference flat and the back surface of the wafer as B, and the phase of the interferogram formed by the cavity of the front reference flat and the back reference flat as C, then the surface parameters may be determined as follows: A corresponds to the front surface height of the wafer, B corresponds to the back surface height of the wafer, C−(A+B) corresponds to the thickness variation in the wafer.

Figure 2B:
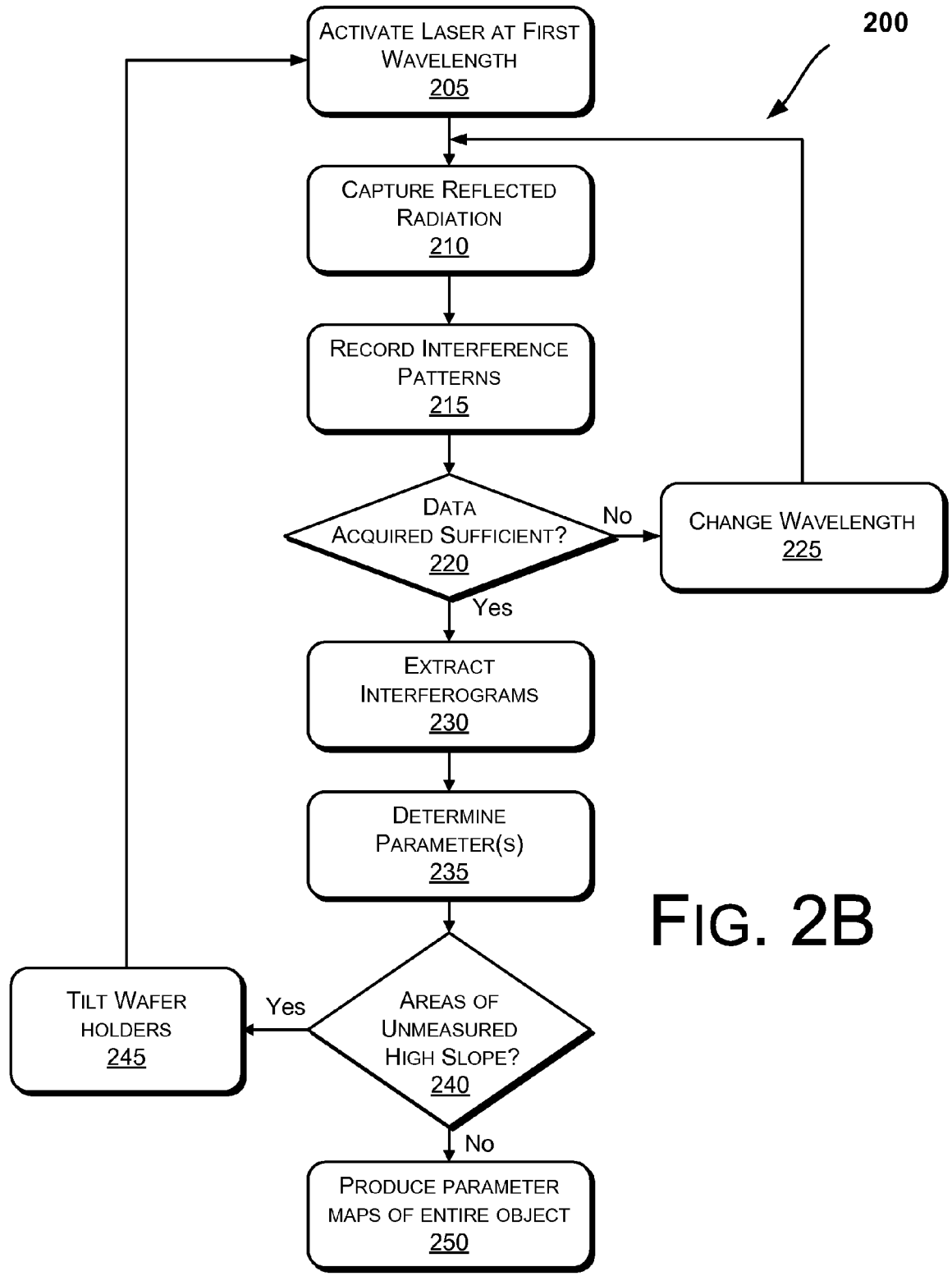
FIG. 2B is a flowchart illustrating operations of a method which may be used to measure the shape and thickness of a wafer with high slopes according to an embodiment.

FIG. 2B is a flowchart illustrating operations of a method which may be used to measure the shape and thickness variation of a wafer according to an embodiment. At operation 205 the laser is activated at a first wavelength. In operation, the laser 110 generates electromagnetic radiation in a range of wavelengths to interferometer 120, 140.

At operation 210 radiation reflected is captured. In some embodiments, radiation reflected is captured as the wavelength of radiation is changing. The reflected radiation is directed by interferometer 120, 140, contemporaneously, multiple interferograms to detector 136, 156 (e.g., a CCD camera or other suitable recording planes). In some embodiments, contemporaneous events may be defined as events that occur within a reasonable time period of one another, given the technical circumstances. The detector 136, 156 may include a frame grabber for storing images; alternatively, the computer 138, 158 may be configured to provide this function. In any event, the images obtained by the detector 136, 156 are supplied to the computer 138, 158 for processing to produce the desired profiles in a suitable form for immediate display, or storage for subsequent utilization. At operation 215 interference patterns in the reflected radiation are captured.

If, at operation 220, the amount of data acquired is not sufficient, then control passes to operation 225 and the wavelength of the radiation generated by laser 110 is changed. In some embodiments, if the amount of data acquired in not sufficient, the control passed to operation 225 to keep changing its wavelength. For example, the wavelength may be increased or decreased by a predetermined amount. Control then passes back to operation 210 and the reflected radiation is captured. Operations 210-225 are repeated until an adequate number of data samples are acquired, whereupon control passes to operation 230 and one or more phases of interferograms are extracted from the data collected. In some embodiments, a control passed to operation 225 to stop its wavelength changing while another control passed to operation 230. In some embodiments, the phases of interferograms may be extracted and stored.

At operation 235 one or more parameters are determined from the phases obtained in operation 230. By way of example and not limitation, arbitrarily identifying the phase of the interferogram formed by the front reference plate 133 and the front 161 of the wafer 160 surface as A, and the phase of the interferogram formed by the back reference flat 153 and the back surface 162 of the wafer 160 as B, and the phase of the interferogram formed by the cavity of the front reference flat 133 and 153 as C, then the surface parameters may be determined as follows: A corresponds to the front surface height of the wafer 160, B corresponds to the back surface height of the wafer, C−(A+B) corresponds to the thickness variation in the wafer 160.

If at operation 240, there are local areas on the object that have unmeasured parameters due to the high slope of the object at those locations, then at operation 245 the object may be tilted. Operations 205 through 235 may then be performed until all local areas of interest with high slopes have been sufficiently mapped.

If at operation 240, there are no additional local areas of interest with high slope, then at operation 250 parameter maps for the entire object may be produced. In some embodiments, a computer may stitch together all partial surfaces that overlap each other and thereby produce a measurement that covers the entire object surface.

Figure 3:
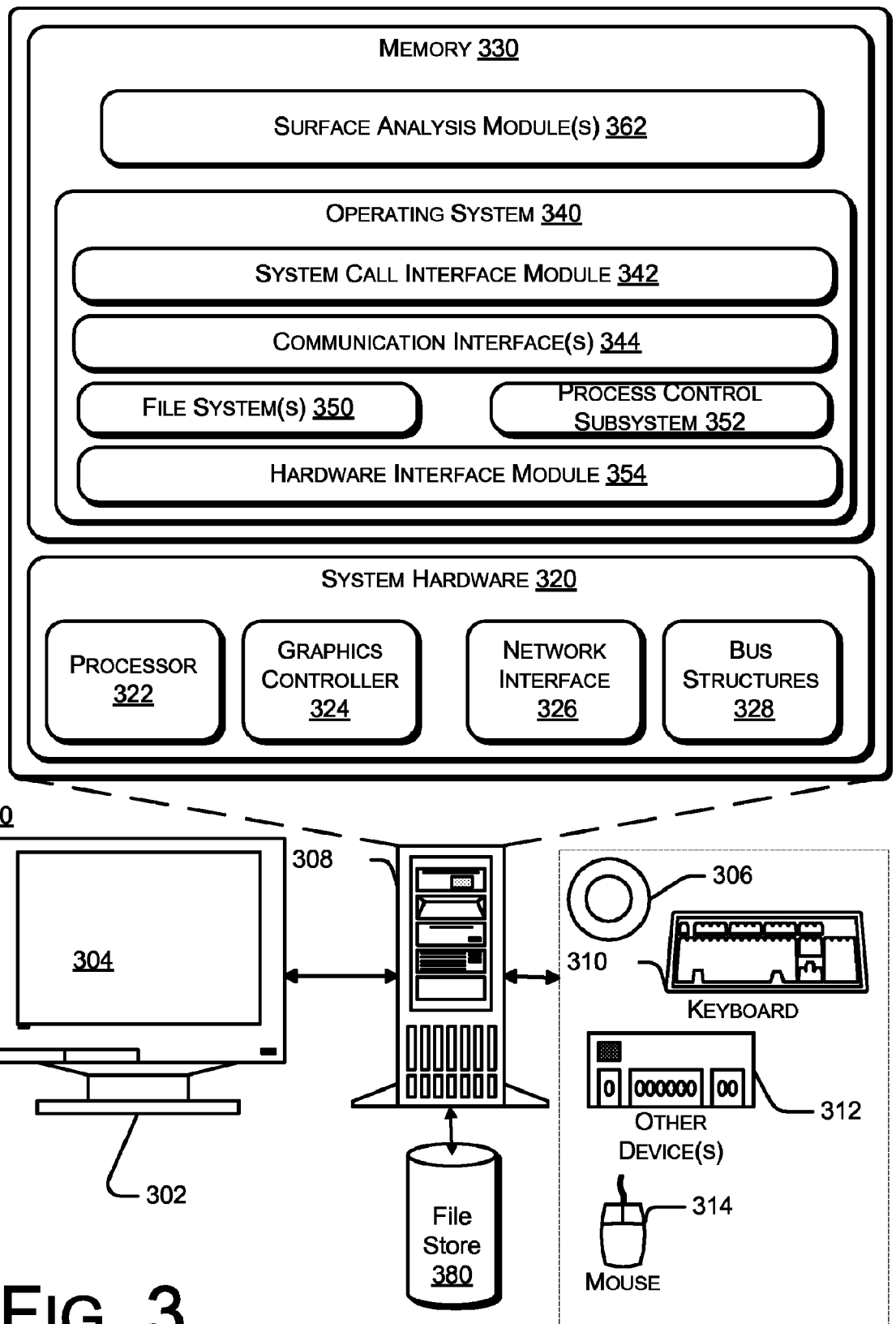
FIG. 3 is a schematic illustration of an integrated visible pilot beam for non-visible interferometric device according to an embodiment.

FIG. 3 is a schematic illustration of one embodiment of a computing system which may be used to implement the computer 138, 158 of FIG. 1. The computer system 300 includes a computer 308 and one or more accompanying input/output devices 306 including a display 302 having a screen 304, a keyboard 310, other I/O device(s) 312, and a mouse 314. The other device(s) 312 can include a touch screen, a voice-activated input device, a track ball, and any other device that allows the system 300 to receive input from a developer and/or a user. The computer 308 includes system hardware 320 and random access memory and/or read-only memory 330. A file store 380 is communicatively connected to computer 308. File store 380 may be internal such as, e.g., one or more hard drives, or external such as, e.g., one or more external hard drives, network attached storage, or a separate storage network.

Memory 330 includes an operating system 340 for managing operations of computer 308. In one embodiment, operating system 340 includes a hardware interface module 354 that provides an interface to system hardware 320. In addition, operating system 340 includes one or more file systems 350 that manage files used in the operation of computer 308 and a process control subsystem 352 that manages processes executing on computer 308. Operating system 340 further includes a system call interface module 342 that provides an interface between the operating system 340 and one or more application modules 362.

In operation, one or more application modules and/or libraries executing on computer 308 make calls to the system call interface module 342 to execute one or more commands on the computer's processor. The system call interface module 342 invokes the services of the file system(s) 350 to manage the files required by the command(s) and the process control subsystem 352 to manage the process required by the command(s). The file system(s) 350 and the process control subsystem 352, in turn, invoke the services of the hardware interface module 354 to interface with the system hardware 320.

The particular embodiment of operating system 340 is not critical to the subject matter described herein. Operating system 340 may be embodied as a UNIX operating system or any derivative thereof (e.g., Linux, Solaris, etc.) or as a Windows® brand operating system.

In some embodiments, computer system 300 includes one or more modules to implement hybrid database query caching. In the embodiment depicted in FIG. 3, computer system 300 includes a surface analysis module 362 which implements the operations described with reference to FIG. 2A and FIG. 2B.

While the invention has been particularly shown and described with reference to a preferred embodiment and various alternate embodiments, it will be understood by persons skilled in the relevant art that various changes in form and details can be made therein without departing from the spirit and scope of the invention. While the invention has been particularly shown and described with reference to a preferred embodiment and various alternate embodiments, it will be understood by persons skilled in the relevant art that various changes in form and details can be made therein without departing from the spirit and scope of the invention.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method for obtaining a shape and thickness variation of an object with parallel surfaces, the method comprising the steps of:
   receiving the object into a cavity between a first reference flat of a first unequal path interferometer and a second reference flat of a second unequal path interferometer such that an optical path remains open around the object at an outer annular area between the first reference flat and the second reference flat;
   receiving a coherent tunable light to the unequal path interferometers;
   recording multiple optical interferograms in response to known phase shifts produced by changes in the wavelength of the light;
   extracting phases of each of the interferograms to produce multiple phase maps;
   determining from each map high slope areas of interest;
   tilting the object to allow measurement of the high slope areas of interest; and
   processing measurements that covers the entire surfaces of the object, including the high slope areas of interest.

2. The method according to claim 1, wherein extracting phases of each of the interferograms is performed contemporaneously.

3. The method according to claim 1, wherein processing the measurements that covers the entire surfaces of the object including the high slope areas of interest comprises:
   receiving the light to the unequal path interferometers after the object has been tilted;
   recording multiple optical interferograms in response to known phase shifts produced by changes in the wavelength of light; and
   extracting phases of each of the interferograms to produce multiple phase maps.

4. The method according to claim 1, wherein the object is placed a first predetermined distance from the first reference surface and a second different predetermined distance from the second reference surface.

5. The method according to claim 1, further comprising determining a first surface height of the object in a high slope area of interest by analyzing the phase of an interferogram formed by the first reference surface and the first surface of the object after the object has been tilted.

6. The method according to claim 1, further comprising determining a second surface height of the object in a high slope area of interest by analyzing the phase of an interferogram formed by the second reference surface and the second surface of the object after the object has been tilted.

7. The method according to claim 1, further comprising determining the object thickness variation at the high slope areas of interest by analyzing:
   the phase of an interferogram formed by the first reference surface and the second reference surface; and
   subtracting the sum of:
      the phase of an interferogram formed by the first reference surface and a first surface of the object after the object has been tilted; and
      the phase of an interferogram formed by the second reference surface and a second surface of the object after the object has been tilted.

8. The method according to claim 1, further comprising combining multiple maps of partial surfaces of the object to produce a map that covers the entire object surface.

9. The method according to claim 1, wherein the high slope areas of interest are defined by a region having a slope greater than the wavelength of the light divided by twice a pixel size of a camera used to record the interferograms.

10. The method according to claim 1, wherein extracting the phases of each of the interferograms is accomplished by a computer.

11. The method according to claim 1, wherein recording the interferograms is accomplished by a CCD camera.

12. An unequal path interferometer system, comprising:
   a first unequal path interferometer with a first reference flat having a first length in a first dimension;
   a second unequal path interferometer with a second reference flat having a second length in the first dimension;
   a cavity defined by a distance between the first reference flat and the second reference flat;
   a holder to receive an object in the cavity such that an optical path remains open around the object at an outer annular area between the first reference flat and the second reference flat;
   a motor coupled to the holder such that the object may be tilted in the cavity;
   a radiation targeting assembly to direct a collimated radiation beam to the interferometer;
   a radiation collecting assembly to collect radiation received from the interferometer; and
   a controller comprising logic to:
      vary a wavelength of the collimated radiation beam;
      record interferograms formed by surfaces of the object;
      extract phases of each of the interferograms to produce multiple phase maps;
      determine from each map high slope areas of interest;
      tilt the object to allow measurement of the high slope areas of interest; and
      process measurements that covers the entire surface of the object including the high slope areas of interest.

13. The system according to claim 12, wherein extracting phases of each of the interferograms is performed contemporaneously.

14. The system according to claim 12, wherein logic to process measurements that covers the entire surface of the object including high slope areas of interest comprises logic to:
   direct a coherent tunable light to the unequal path interferometers after the object has been tilted;
   record multiple optical interferograms in response to known phase shifts produced by changes in the wavelength of the coherent tunable light; and
   extract phases of each of the interferograms to produce multiple phase maps.

15. The system according to claim 12, further comprising an object placed in the holder.

16. The system according to claim 15, wherein a height of a first surface of the object in a high slope area of interest is determined by analyzing the phase of an interferogram formed by the first reference surface and the first surface of the object after the object has been tilted.

17. The system according to claim 15, wherein a height of a second surface of the object in a high slope area of interest is determined by analyzing the phase of interferogram formed by the second reference surface and the second surface of the object after the object has been tilted.

18. The system according to claim 15, wherein the object thickness variation on at the high slope areas of interest is determined by analyzing:

the phase of an interferogram formed by the first reference surface and the second reference surface; and subtracting the sum of the phase of an interferogram formed by the first reference surface after the object has been tilted and a first surface of the object, and the phase of an interferogram formed by the second reference surface after the object has been tilted and a second surface of the object.

19. The system according to claim 15, further comprising combining multiple maps of partial surfaces of the object to produce a map that covers the entire object surface.

20. The system according to claim 15, wherein the holder disposes the object at a first predetermined distance from the first reference surface and at a second different predetermined distance from the second reference surface.

21. The system according to claim 15, wherein the high slope areas of interest are defined by a region having a slope greater than the wavelength of the light divided by twice a pixel size of a camera used to record the interferograms.

22. The system according to claim 12, wherein the radiation targeting assembly comprises a tunable laser.

23. The system according to claim 12, wherein the unequal path interferometers are Fizeau interferometers.

24. The system according to claim 12, wherein the unequal path interferometers are Twyman-Green interferometers.

* * * * *